Oct. 7, 1969     ISAAC TRACHTENBERG     3,471,338
METHOD OF MAKING A FUEL CELL ELECTRODE
Filed Oct. 31, 1966
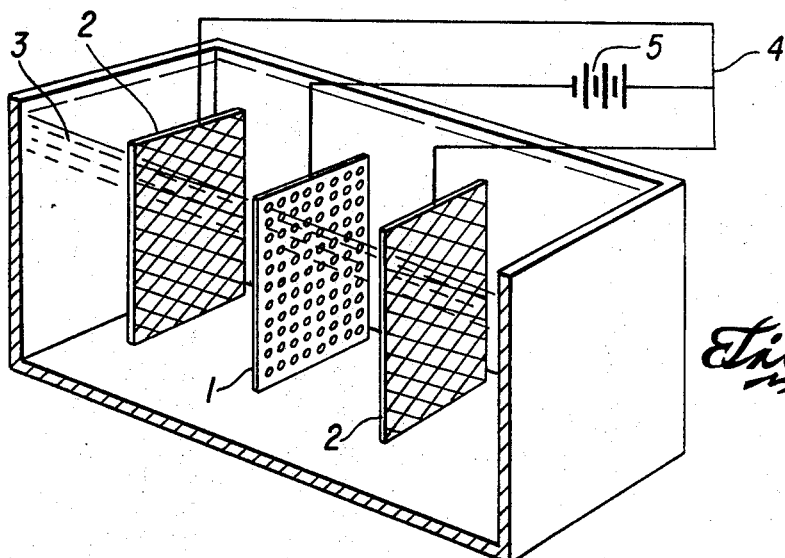
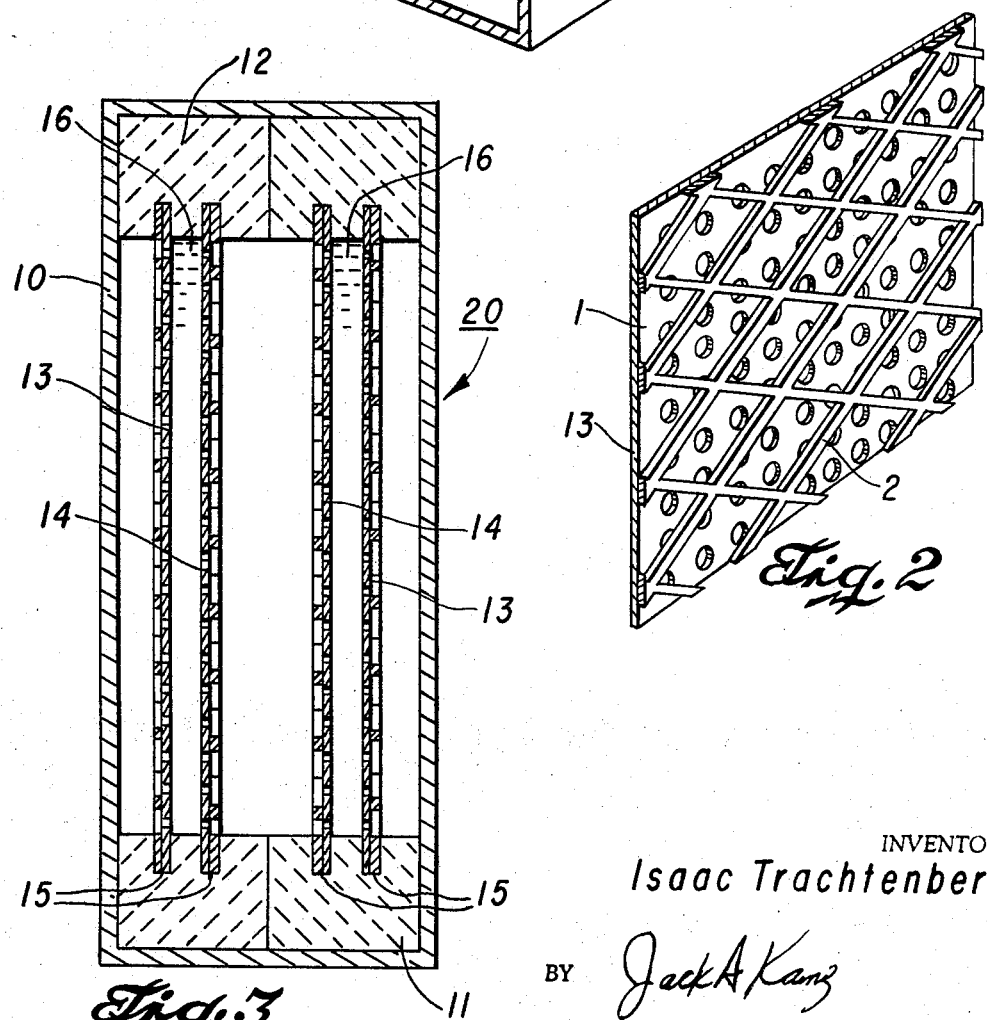
INVENTOR
*Isaac Trachtenberg*
BY *Jack A. Kanz*
ATTORNEY United States Patent Office 3,471,338
Patented Oct. 7, 1969

3,471,338
METHOD OF MAKING A FUEL CELL ELECTRODE
Isaac Trachtenberg, Dallas, Tex., assignor to Texas Instruments Incorporated, Dallas, Tex., a corporation of Delaware
Filed Oct. 31, 1966, Ser. No. 590,724
Int. Cl. H01m 13/08
U.S. Cl. 136—120    8 Claims

ABSTRACT OF THE DISCLOSURE

Method of making an electrode by covering a strip of fine metal foil with a photoresist material, forming a mask with a desired pattern of aligned openings and simultaneously etching a metal from a metal foil and depositing the etched metal on a support for the foil.

---

This invention relates to fuel cell electrodes and more particularly to a method of making an electrode by simultaneously etching a metal from a metal foil and depositing the etched metal on a support for the foil. The invention also appertains to an electrode made by this method.

As is well known in the art, a fuel cell generally comprises a cathode, an anode and a separating electrolyte, whereupon a fuel, for example a hydrocarbon, reacts with the anode side of the electrolyte and an oxidant, for example air, reacts with the cathode side of the electrolyte. The reaction produces a flow of current when the anode and cathode are connected to an external circuit.

One electrode requirement of fuel cells is short pore length (length of apertures or openings in the electrode). For any given pore size, the total internal active surface area available to catalyze the desired electrode reaction is a function of pore length. It has been found, however, that optimum diffusion rates as well as other advantages such as reduced unit weight are obtained with porous electrode plates or screens of minimum thickness. Because of the thinness and fragility of such a screen or porous plate, a support therefor must be supplied. Such support needs to be made from the same metal as the porous plate or the support plated with the same metal as the plate to prevent corrosive action due to having two dissimilar metals in contact with each other and to form a good bond between the porous plate and the support. In addition to short aperture length, the electrode should have uniform aperture size and spacing for uniform action over the entire electrode face.

Accordingly, an object of the invention is to provide an electrochemical method of forming apertures in a thin metal strip while simultaneously plating the support for the metal strip with the metal removed in forming the apertures.

Another object of the invention is to provide an improved method of accurately forming very thin fuel cell electrodes with uniform aperture size and spacing.

Another object of the invention is to provide a chemical method of forming the apertures in very thin fuel cell electrodes.

Still another object of the invention is a very thin fuel cell electrode with uniform aperture size and spacing.

The novel features believed to be characteristic of this invention are set forth with particularity in the appended claims. The invention itself, however, as well as further objects, features and advantages thereof, may best be understood by reference to the following detailed description of an illustrative embodiment, when read in conjunction with the accompanying drawing, wherein:

FIGURE 1 is a pictorial view of the electrochemical circuit used to simultaneously etch a metal foil and electroplate a metal support, which parts are used to form the completed electrode;

FIGURE 2 is an isometric view of a portion of the metal foil bonded to the electroplated metal support; and FIGURE 3 is a view of a portion of a typical fuel cell, including a cathode fabricated according to the method of the invention.

In brief, the invention appertains to a method of making an improved electrode for a fuel cell. Although the method is herein described and illustrated with respect to the use of a thin silver foil as a preferred embodiment, it should be understood that other metal foils such as nickel, nickel alloys, copper or any other suitable metal can be used equally well. The method includes the use of photoresist techniques and chemical etching methods common in the fabrication of semiconductor devices, to achieve a wide variety of closely controlled patterns and size openings in very thin electrodes. In the preferred embodiment of the invention, a strip of fine silver foil is covered on both sides with a photoresist material. The photoresist material is exposed through a negative, developed and baked to form a mask. The mask protects the silver foil from the subsequent etching process except for the areas of silver exposed by openings in the mask which correspond to the pattern of apertures desired in the silver foil. However, due to the thinness of the foil, the foil must have a backing or support when used as a fuel cell electrode. In order to obtain the required strength, therefore, it is necessary to bond the silver foil to another material such as, for example, expanded metal of stainless steel. However, because steel is subject to corrosion, the steel support also needs to be plated with silver before it can be bonded to the foil. This is accomplished by connecting the steel support as the cathode and the metal foil as the anode in an electrochemical circuit, the steel support being plated with silver simultaneously with the etching out of the apertures in the silver foil.

Referring now to the figures of the drawing, FIGURE 1 illustrates the electrochemical etching and plating steps of the invention. In the following description, and only by way of illustration, the invention is described with specific dimensions and materials. These are given solely as examples and are not to be construed as limiting the invention. To prepare the silver foil for etching, a piece of fine silver foil, 5 millinches in thickness, for example, is cleaned, smoothed and annealed at about 300° C. in a neutral atmosphere such as nitrogen for about one hour.

A suitable photoresist material, such as KTFR, manufactured by the Eastman Kodak Company, is applied to both sides of the foil to form a mask on each side. Negatives are prepared by conventional photographic techniques with the desired pattern, for example, 3 millinch diameter holes on 10 millinch centers. Two of these negatives are placed adjacent the KTFR coated silver foil, one negative being placed on each side of the foil and precisely aligned in relationship with the other negative. The photoresist is exposed through the negatives, developed and baked according to standard techniques employed in the semiconductor industry. By so doing, the areas of the silver to be removed in order to form the apertures are exposed for etching while the remaining photoresist material protects the rest of the foil.

As previously stated, in order to obtain the required mechanical strength of the electrode, some other material must be bonded to the silver foil. A convenient mechanical support material, by way of example, is 2/0 mesh expanded metal of 316 stainless steel. However, due to the corrosive nature of most electrolytes, such as, for example, molten lithium sodium carbonate $LiNaCO_3$, the steel support must be plated for protection from corrosive attack. By plating the steel support with silver, the plated support bonds easily to the silver foil.

The apertures in the silver foil are formed and the silver from the apertures is deposited on the steel support simultaneously by using an electrochemical process with suitable apparatus such as indicated in FIGURE 1. A steel support 2 is spaced a short distance away from and on each side of the silver foil 1. The steel supports act as the cathode in the electrochemical reaction and the silver foil acts as the anode. Preferably, two supports are used for a cathode, as illustrated in FIGURE 1, one on each side of the silver anode in order to etch the silver foil from both sides. Both the single silver foil 1 and the two steel supports 2, arranged as described, are immersed in a conductive chemical solution 3 and connected by an external circuit 4 to a voltage source 5. The circuit is completed by the chemical solution 3. Although solution 3 can be of many different compositions, the solution used in this particular embodiment is as follows:

105 grams of KCN per liter of water
15 grams of $K_2CO_3$ per liter of water
20 grams of KOH per liter of water The silver foil 1 and steel supports 2 are immersed in the electrochemical solution 3 for about 15 minutes with a current of about 0.75 ampere supplied by the battery 5 in the external circuit 4. This DC current, instead of being supplied by a battery, can be equally supplied by a rectified alternating current. The etched silver foil is removed from the etching solution after about 15 minutes, washed with distilled water and allowed to dry. Another silver foil is then placed in the etching solution for an additional 15 minutes at 0.75 ampere. The reason for the use of two foils is that, with the parameters given above for the supports and the silver foil, not enough silver is removed from one silver foil to plate both steel supports with sufficient silver. Hence a second silver foil is etched also and more silver provided to plate the steel supports. The solution is not stirred during this process nor is any additional silver added. As the current flows through the completed circuit (which includes the external circuit, silver anode, steel cathodes, and chemical solution), the silver is removed from the silver foil from the areas that were left exposed following the photoresist operation. The ionized silver leaves the silver anode, migrates through the chemical solution and deposits upon the steel cathodes, thereby insuring a uniform coating of silver on the supports. Other etching times and currents can be employed when the size and shape of the apertures etched in the silver need to be varied.

At the end of the etching and plating process, the external circuit 4 is disconnected. The steel supports and the silver foil are removed from the chemical solution, washed thoroughly with distilled water and allowed to dry. After removal of the photoresist masks from the silver foil, the foil and one steel support are ready for bonding together. At this point it should be noted that the use of the two steel supports 2 with an intermediate silver foil 1 from to each out the apertures in the foil and plate the surface of the supports with the etched out silver, as indicated in FIGURE 1, merely illustrates one of the ways of accomplishing both results. Etching and plating could be performed with only one steel support, though it would take longer to etch through the silver to form the desired apertures with only one support (one cathode instead of two). Moreover, and as previously described, the use of two foils 1 to obtain sufficient silver from the apertures to adequately plate the surfaces of the supports is conditioned by the parameters of the foil and the support. Should the parameters be increased and more silver is needed to plate the surfaces of the supports, additional silver foils could be used, or less than two might be required if the parameters are decreased.

By the use of the described masking and etching techniques, the spacing of the apertures in the silver foil and their dimensions are much more closely controlled than they are in a screen or sintered powder electrodes.

After the apertures are etched in the silver foils and the supports plated, one silver foil and one silver plated stainless steel support are placed in contact wtih each other under slight pressure and fired in a furnace with a neutral or reducing atmosphere such as nitrogen or hydrogen, respectively, for about three hours at about 850° C. A silver-to-silver band is thereby effected between the silver plated steel support and the silver foil by this heating operation, the composite cathode being illustrated in cross section in FIGURE 2 in which the numeral 1 designates the etched silver foil and the numeral 2 designates the steel support.

Two electrodes are cut in the desired shape and inserted in a fuel cell 20 as shown in FIGURE 3, said electrodes being indicated by the number 13. It is to be understood that fuel cell 20 is merely an example of one form of fuel cell utilizing a cathode composed of a silver plated stainless steel support bonded to a silver foil; various other fuel cell configurations may be used in place of the specific one illustrated. The fuel cell 20 illustrated is one which uses a molten inorganic salt electrolyte. The cell comprises a housing 10 which contains a pair of channeled spacing members 11 and 12. Each spacing member has one or more channels 15 along one surface thereof and the channeled surfaces of a pair of spacing members are opposed and spaced apart. A pair of foraminous electrodes 13 and 14 within the channels are securely positioned and spaced substantially parallel to each other by the channels 15. The electrode 13 is fabricated according to the invention. Molten inorganic electrolyte 16 such as $LiNaCO_3$ is contained between the electrodes. The fuel cell is typically operated at about 500° C.–700° C.

In the embodiment shown, the inner electrodes 14 are the fuel anodes and the outer electrodes 13 are the oxidant cathodes. In operation, air and carbon dioxide are passed between the cathode 13 and housing 10. A hydrogen-containing gas is passed between the fuel electrodes 14.

The reaction of the fuel electrode 14 is as follows:

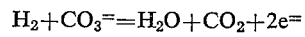

The reaction at the oxidizing electrode 15 is as follows:

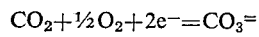

By way of example, a cell similar to fuel cell 20 as illustrated in FIGURE 3 was constructed and operated with the electrodes fabricated as described and acting as the oxidizing electrode or cathode 13. This cell employed slurried $MgO$—$LiNaCO_3$ as the electrolyte-matrix and operated at 650° C. With a fuel composition of 80% wet hydrogen and 20% carbon dioxide as the oxidant, this cell produced an equivalent of 29.8 watts/ft.$^2$ at 0.50 volt. The maximum power output was 38.7 watts/ft.$^2$.

While the invention has been described with reference to a specific method and embodiment, it is to be understood that this description is not to be construed in a limiting sense. Various modifications of the invention will become apparent to persons skilled in the art without departing from the spirit and scope of the invention as defined by the appended claims.

What is claimed is:
1. In a method of making a fuel cell electrode, the steps of:
  (a) forming a mask with a desired pattern of aligned openings on both sides of a metal foil;
  (b) immersing said metal foil in an electrolyte solution;
  (c) immersing a metal support adjacent to but separated from said metal foil in said electrolyte solution;
  (d) connecting said metal foil and said metal support to an external voltage source; and
  (e) electrochemically etching metal from said metal foil in areas exposed by said openings in said mask to form apertures in said metal foil while simultaneously electrochemically plating said metal support with the metal etched from said metal foil.
2. In the method as defined in claim 1 wherein said metal foil is silver.

3. In the method as defined in claim 1 wherein said metal foil is nickel.

4. In the method as defined in claim 1 wherein said metal foil is copper.

5. In the method as defined in claim 1 wherein said metal support is steel.

6. In a method of making a fuel cell electrode, the steps of:
(a) forming a mask with a desired pattern of aligned openings on both sides of a metal foil;
(b) immersing said metal foil in an electrolyte solution;
(c) immersing a metal support adjacent to but separated from said metal foil in said electrolyte solution;
(d) connecting said metal foil and said metal support to an external voltage source;
(e) etching metal from said metal foil in areas exposed by said openings in said mask to form apertures in said metal foil while simultaneously plating said metal support with the metal etched from said metal foil;
(f) removing said mask from said metal foil; and
(g) bonding said metal foil with said apertures to the plated metal support by heating said metal foil and said plated metal support together under slight pressure in a non-oxidizing atmosphere to a temperature sufficient to form a metal-to-metal bond.

7. The method of making a fuel cell electrode according to claim 6, wherein said metal foil is silver and said metal support is steel.

8. In a method of making a fuel cell electrode, the steps of:
(a) forming a mask with a desired pattern of aligned openings on both sides of a metal foil;
(b) immersing said metal foil in an electrolyte solution;
(c) immersing two metal supports in said electrolyte solution, one of said metal supports being adjacent to one side of said metal foil and the other of said metal supports being adjacent to the opposite sides of said metal foil;
(d) connecting said metal foil and said metal supports to an external voltage source;
(e) etching metal from said metal foil in areas exposed by said openings in said mask to form apertures in said metal foil while simultaneously plating said metal supports with the metal etched from said metal foil;
(f) removing said mask from said metal foil; and
(g) bonding said metal foil with said apertures to one of said plated metal supports by heating said metal foil and one of said plated metal supports together under slight pressure in a non-oxidizing atmosphere at a temperature sufficient to form a metal-to-metal bond.

References Cited

UNITED STATES PATENTS

| | | | |
|---|---|---|---|
| 1,700,178 | 1/1929 | Porzel | 204—282 XR |
| 2,421,607 | 6/1947 | Fowler | 204—143 XR |
| 2,431,949 | 12/1947 | Martz | 204—235 |
| 2,695,351 | 11/1954 | Beck | 204—143 |
| 2,869,266 | 1/1959 | Hirdler | 204—143 XR |
| 3,013,956 | 12/1961 | Hugle et al. | 204—143 |

WINSTON A. DOUGLAS, Primary Examiner

A. SKAPARS, Assistant Examiner

U.S. Cl. X.R.

204—13.143